US005727191A

United States Patent [19]

Konishi et al.

[11] Patent Number: 5,727,191

[45] Date of Patent: Mar. 10, 1998

[54] MONITOR ADAPTER

[75] Inventors: Kazuhiro Konishi; Masaki Ono, both of Matto, Japan

[73] Assignee: Nanao Corporation, Ishikawa, Japan

[21] Appl. No.: 649,664

[22] PCT Filed: May 9, 1994

[86] PCT No.: PCT/JP94/00754

§ 371 Date: May 29, 1996

§ 102(e) Date: May 29, 1996

[87] PCT Pub. No.: WO95/30634

PCT Pub. Date: Nov. 16, 1995

[51] Int. Cl.[6] .......... G06T 1/60

[52] U.S. Cl. .......... 395/507; 345/132

[58] Field of Search .......... 345/132, 113; 395/507

[56] References Cited

U.S. PATENT DOCUMENTS

| | | | |
|---|---|---|---|
| 4,897,812 | 1/1990 | Lessard et al. | 395/507 |
| 4,991,023 | 2/1991 | Nicols | 348/455 |
| 5,038,301 | 8/1991 | Thoma, III . | |
| 5,276,458 | 1/1994 | Sawdon | 345/132 |
| 5,387,915 | 2/1995 | Moussa et al. | 342/40 |
| 5,457,473 | 10/1995 | Arai et al. . | |

FOREIGN PATENT DOCUMENTS

| | | |
|---|---|---|
| 4305026 | 8/1993 | Germany . |
| 5613286 | 7/1979 | Japan . |
| 58-103034 | 6/1983 | Japan . |
| 1-162393 | 11/1989 | Japan . |
| 1-295297 | 11/1989 | Japan . |
| 1-173787 | 12/1989 | Japan . |
| 3504049 | 9/1991 | Japan . |
| 4257023 | 9/1992 | Japan . |
| 5-88635 | 4/1993 | Japan . |
| 5-66731 | 9/1993 | Japan . |
| 8905502 | 6/1989 | WIPO . |
| 9306587 | 1/1993 | WIPO . |

*Primary Examiner*—Raymond J. Bayerl
*Assistant Examiner*—Cao H. Nguyen
*Attorney, Agent, or Firm*—Ostrolenk, Faber, Gerg & Soffen, LLP

[57] ABSTRACT

In DDC1, a data request signal is applied to overlap a vertical synchronization signal from a computer 1 to a terminal 33, the data request signal is applied from a receiver 24 through a switch 25 to a non-volatile memory 27, information related to a video monitor 4 is read from the non-volatile memory 27, and the read information is applied from a driver 21 through a data terminal 31 to the computer 1. In DDC2B, a data request signal is applied to both the data terminal 31 and a clock terminal 32, a part of the data request signal is decoded by a data request decoder 28 through a receiver 22, the data request signal is applied through the switch 25 to the non-volatile memory 27, information is read from the non-volatile memory 27, and the read information is applied from the driver 21 through the data terminal 31 to the computer 1.

8 Claims, 3 Drawing Sheets

MONITOR ADAPTER

FIELD OF THE INVENTION

The present invention relates to a monitor adapter. More particularly, the present invention relates to a monitor adapter connected between a personal computer and a video monitor for carrying out a relay to transmit information required for Plug and Play to the personal computer and to transmit an optimal video signal for the video monitor from the personal computer to the video monitor.

BACKGROUND ART

In an IBM PC/AT compatible personal computer, the irreducible minimum functions are provided for a main body thereof in order to utilize open architecture, and various functions can be added to the main body in the form of boards for user's specific demands in order to allow for selection by the user. This board is called an add-on board. At present, the add-on boards include a video card, an SCSI card (one of the interface standards for external storage apparatuses), a net work card, a sound source board and the like.

However, the add-on boards are put on the market by manufacturers other than those of personal computers, based on inconsistent standards established by themselves, and therefore, the user often cannot operate a personal computer without knowledge thereof even if the user purchases peripheral equipment and an add-on board and tries to connect them with the personal computer, which is serious problem of a personal computer.

Thus, recently, all the hardware (such as an add-on board and an external apparatus) connected to a personal computer has been basically increasingly made to have functions to communicate with an OS under a prescribed rule, to notify the OS of its own function and performance according to the request of the OS, and to reset itself based on arbitration of the OS. With these functions, optimal setting is performed automatically, and the user can use a personal computer without difficulty even if he/she knows nothing about computers. More specifically, this method allows the user to operate a personal computer by merely selecting a function by himself/herself and inserting an add-on board thereinto, which is called Plug and Play, so that convenience on the part of the user can be improved.

By the way, a recent personal computer can output a high resolution image signal, and a display system capable of displaying such a high resolution image and of carrying out Plug and Play has been proposed as a video monitor in the U.S. Pat. No. 5,276,458.

FIG. 5 is schematic block diagram showing the proposed display system described above. In FIG. 5, an ROM 81, a memory 82, an I/O 84, a communication adapter 85, a keyboard adapter 90 and a display adapter 92 are connected to a CPU 80 through a bus 86. A keyboard 91 is connected to keyboard adapter 90, and these components from CPU 80 to keyboard adapter 90 constitute a computer in a well-known manner. An external disk file 83 is connected to I/O 84, and communication adapter 85 transmits and receives data to and from a host computer 93.

Display adapter 92 performs a Plug and Play function for a CRT display apparatus 88. More specifically, display adapter 92 outputs a video signal and a synchronization signal to an output port 94 for enabling display apparatus 88. Display apparatus 88 includes a non-volatile memory 9 and device logic 97, and device logic 97 is connected to adapter logic 96 in display adapter 92 through a serial line 3. Non-volatile memory 9 stores display information, and adapter logic 96 and device logic 97 constitute communication logic 95. Adapter logic 96 applies a command for read data and write data of non-volatile memory 9 to device logic 97 through serial line 3, and device logic 97 responsively accesses non-volatile memory 9 to read display information therefrom, and supplies the display information to adapter logic 96 through serial line 3. Adapter logic 96 supplies RGB data to display apparatus 88 such that display apparatus 88 operates in a mode adapted to itself.

In the example shown in FIG. 5, however, display adapter 92 cannot be connected to display apparatus 88 so as to display an image in an optimal mode of display apparatus 88, if non-volatile memory 9 and device logic 97 are not provided in advance in display apparatus 88. More specifically, a conventional video monitor which is not provided with non-volatile memory 9 and device logic 97 cannot be connected to a personal computer with Plug and Play.

On the other hand, VESA (Video Electronics Standards Association) has been established for standardization of image output in general to a video monitor in a personal computer, and standardization is being carried out in a wide range from a method of accessing a video card by software to a function of a video monitor, so that guidelines are shown to employ DDC (Display Data Channel) as a standard of Plug and Play in a video monitor.

The DDC is provided for the purpose of implementing at least Plug and Play, and is intended in an upper class to achieve an improved function by using a bidirectional bus and to have an additional function without an additional cable by providing a line for communication within a video cable.

The DDC is divided into three classes of DDC1, DDC2B and DDC2AB. DDC1 transfers data from a video monitor to a personal computer in one direction using original two lines as a bus, and DDC2B transfers data continuously and sequentially from a video monitor using an I2C bus as a bus when a personal computer initially requests data from the video monitor. The I2C bus is one of the standards of bidirectional serial data transfer by means of two signals of clock and data signals. DDC2AB only transfers data according to request of a personal computer from the personal computer to a video monitor through an I2C bus, and carries out bidirectional communication.

DISCLOSURE OF THE INVENTION

It is therefore a primary object of the present invention to provide a monitor adapter capable of even connecting a conventional video monitor which does not have a Plug and Play function to a computer with a Plug and Play function.

It is another object of the present invention to provide a television monitor adapter which can be connected to a computer with a Plug and Play function in a manner adapted to DDC.

The present invention is a monitor adapter connected between a computer and a video monitor for causing an optimal video signal to be output from the computer according to a condition of the video monitor, and includes a data terminal for transmitting and receiving data to and from the computer bidirectionally, storage means for prestoring information on the video monitor, and control means responsive to supply of a data request signal to the data terminal for reading information from the storage means and outputting the information to the data terminal.

Consequently, according to the present invention, since information related to a video monitor can be output to a computer, even a conventional video monitor can be connected to a computer with a Plug and Play function.

The present invention includes, in another aspect, a data terminal for transmitting and receiving data to and from a computer bidirectionally, an input terminal for receiving a data request signal transmitted so as to overlap a synchronization signal from the computer, storage means for prestoring information on a video monitor, and control means responsive to the data request signal transmitted so as to overlap the synchronization signal to the input terminal for reading information from the storage means and outputting the information to the data terminal.

Therefore, according to the above mentioned another aspect of the present invention, the monitor adapter can be connected to a computer with a Plug and Play function in a manner adapted to DDC1.

The present invention includes, in a further aspect, a data terminal, a clock signal terminal for receiving a clock signal, storage means, and control means, and when a data request signal and a clock signal are respectively applied to the data terminal and the clock signal terminal, information is read from the storage means in response to the clock signal and is output to the data terminal.

Accordingly, a monitor adapter of the present invention can be connected to a computer with a Plug and Play function in a manner adapted to the DDC2B class.

The present invention, in a still further aspect, is a monitor adapter connected between a computer and a video monitor for causing an optimal video signal to be output from the computer according to a condition of the video monitor, and includes a data terminal for transmitting and receiving data to and from the computer bidirectionally, a first terminal for receiving a data request signal transmitted so as to overlap a vertical synchronization signal from the computer in a first mode, a second terminal for receiving, together with the data terminal, a data request signal from the computer in a second mode, a storage circuit for prestoring information related to the video monitor, and a switching control circuit responsive to the data request signal transmitted to the first terminal for reading information from the storage circuit and outputting the information to the data terminal in the first mode, and responsive to the data request signal transmitted to the data terminal and the second terminal for reading information from the storage circuit and outputting the information to the data terminal in the second mode.

Consequently, according to the present invention, since information related to a video monitor can be output to a computer in either a first mode or a second mode, even a conventional video monitor can be connected to a computer with a Plug and Play function in a manner adapted to DDC.

More preferably, the switching control circuit includes a switching circuit having its input switched to the side of the first terminal in a first mode and switched to the side of the second terminal in response to supply of a part of a data request signal to the data terminal.

More preferably, the present invention further includes a first receiver for receiving a part of a data request signal applied to the data terminal and switching the input of the switching circuit to the side of the second terminal at its output.

More preferably, the present invention further includes a driver for outputting information read from the storage circuit to the data terminal.

More preferably, the present invention further includes a second receiver for receiving a vertical synchronization signal and a data request signal input to the first terminal and applying the received signals to the switching circuit, and a third receiver for receiving a part of a data request signal input to the second terminal and applying the received signal to the switching circuit.

The present invention further includes a filter for removing a data request signal contained in an output of the second receiver and outputting only a vertical synchronization signal to the video monitor.

More specifically, the present invention further includes a plurality of I/O terminals for receiving a horizontal synchronization signal and RBG color signals output from the computer and outputting the received signals to the video monitor.

BEST MODE FOR CARRYING OUT THE PRESENT INVENTION

Figure 1:
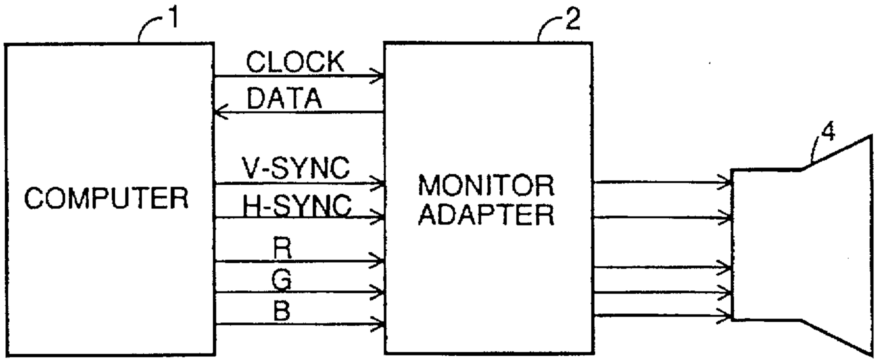
FIG. 1 is a schematic block diagram showing the whole structure of one embodiment of the present invention.
Figure 2:
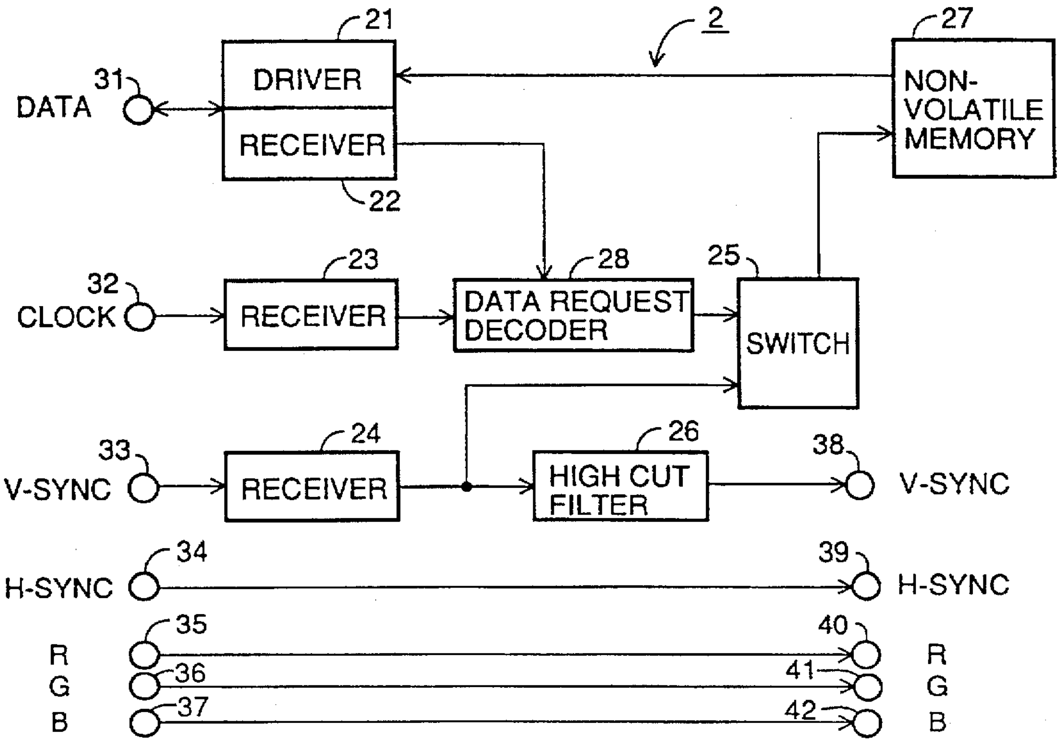
FIG. 2 is a block diagram specifically showing a monitor adapter shown in FIG. 1.

FIG. 1 is a schematic block diagram showing the whole structure of one embodiment of the present invention, and FIG. 2 is a block diagram specifically showing a monitor adapter 2 shown in FIG. 1.

The present invention is made to be able to deal with any class of DDC1 and DDC2B out of the above described VESA standards. In FIG. 1, monitor adapter 2 characteristic of the present invention is connected between a computer 1 and a video monitor 4. Signal lines for a clock signal, data, a vertical synchronization signal, a horizontal synchronization signal and RGB signals, respectively, are connected between computer 1 and monitor adapter 2. Signal lines for supplying a vertical synchronization signal, a horizontal synchronization signal and RGB color signals, respectively, are connected between monitor adapter 2 and video monitor 4.

As shown in FIG. 2, monitor adapter 2 includes a driver 21, receivers 22–24, a switch 25, a high cut filter 26, a non-volatile memory 27, and a data request decoder 28. Driver 21 and receiver 22 are connected from a data terminal 31 through a bidirectional data line to computer 1, and a data request signal from computer 1 is received by receiver 22 and then applied to data request decoder 28. Data request decoder 28 decodes the data request signal and applies the decoded signal to switch 25. Driver 21 transmits information read from non-volatile memory 27 to computer 1. Receiver 23 receives a signal applied through a clock terminal 32 from computer 1 and applies the received signal to switch 25. Signal lines connected to data terminal 31 and clock terminal 32 constitute an I2C bus. Receiver 24 receives a data request signal transmitted so as to overlap a vertical synchronization signal from computer 1 through terminal 33, and applies the received signals to switch 25 and high cut filter 26. If a data request signal is applied from data request decoder 28 to switch 25, the switch outputs the data request signal, and the switch otherwise switches its input to the output side of receiver 24.

Non-volatile memory 27 stores, as information on video monitor 4, the name of manufacturer, a product code, a serial number, a picture size, an available video timing, resolution, a frequency of a synchronization signal which can be input thereto, and the like. In addition, the non-volatile memory 27 receives a signal from switch 25, reads necessary information, and outputs the information to driver 21. High cut filter 26 removes a high frequency component contained in a vertical synchronization signal. It is noted that monitor adapter 2 may be formed integrally with a cable connected to computer 1 and/or a cable connected to video monitor 4.

The operation of the present embodiment of the invention will now be described. First, in the DDC1 class of a first mode, computer 1 sends a data request signal of, for example, 25 kHz to terminal 33 so as to overlap a vertical synchronization signal. The data request signal is applied to switch 25 through receiver 24. In a class other than DDC2B, an input of switch 25 has been switched to the output side of receiver 24, and the data request signal is applied from switch 25 to non-volatile memory 27. Non-volatile memory 27, in response to the data request signal, reads stored information and applies the read information to driver 21. Driver 21 transmits the applied information from data terminal 31 through the bidirectional data line to computer 1. High cut filter 26 removes a component of 25 kHz from an output of receiver 24, and transmits only a vertical synchronization signal to video monitor 4 through an output terminal 38. It is noted that a horizontal synchronization signal and RGB color signals are respectively applied from computer 1 to input terminals 34, 35, 36 and 37, and these signals are respectively output to video monitor 4 through output terminals 39–42.

On the other hand, in DDC2B of a second mode, computer 1 transmits a data request signal to both data terminal 31 and clock terminal 32, while transmitting a clock signal to clock terminal 32. A part of the data request signal is applied to data request decoder 28 through receiver 22, and the data request signal is decoded therein and applied to switch 25. Switch 25 responsively switches its input to the output side of receiver 23. Thus, the clock signal input to clock terminal 32 is applied from receiver 23 through switch 25 to non-volatile memory 27, and non-volatile memory 27 reads information in response to the clock signal and the read information is transmitted from driver 21 through data terminal 31 to computer 1. In the DDC2B, only a vertical synchronization signal is output to terminal 33, and this vertical synchronization signal is output through receiver 24 and high cut filter 26 to output terminal 38, and is applied to video monitor 4. A horizontal synchronization signal and RGB color signals are input to input terminals 34–37 and output to video monitor 4 through output terminals 39–42, respectively, as in the case of the DDC1.

As described above, in the present embodiment of the invention, since DDC1 and DDC2B can be switched to each other and necessary information can be read from non-volatile memory 27 and output to computer 1 by merely outputting a data request signal to terminal 33 or outputting a data request signal to data terminal 31 and clock terminal 32, separate non-volatile memory and the like need not be provided for video monitor 4, and an optimal image signal can be output from computer 1 to video monitor 4 by merely connecting display adapter 2 between computer 1 and video monitor 4.

Figure 3:
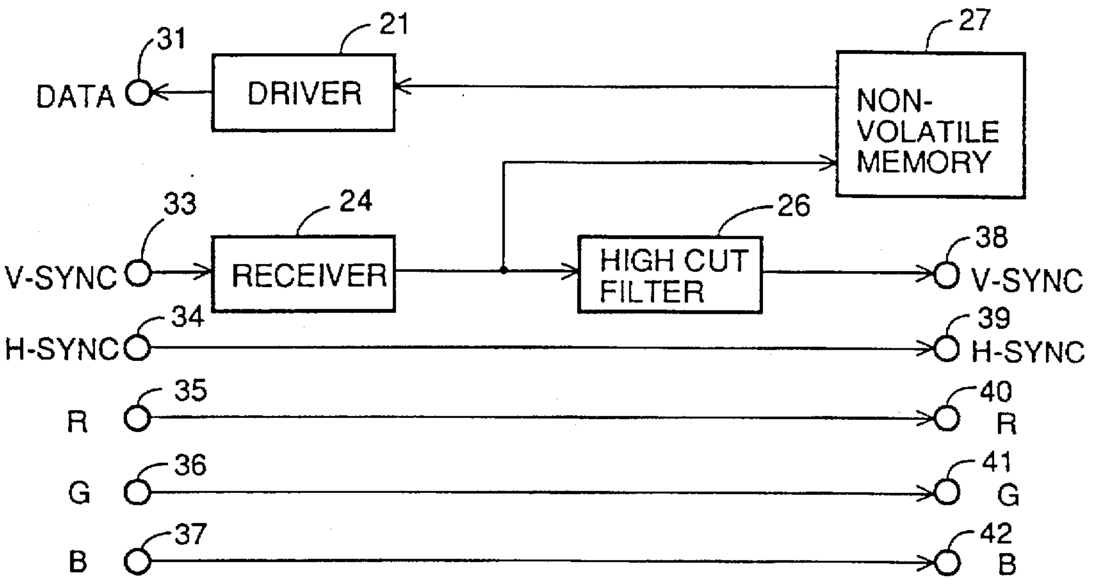
FIG. 3 is a block diagram showing a monitor adapter in accordance with another embodiment of the present invention.

FIG. 3 is a block diagram showing another embodiment of the present invention. Although the above described embodiment shown in FIG. 2 is intended to deal with both classes of DDC1 and DDC2B, the embodiment shown in FIG. 3 is intended to deal only with DDC1, and clock terminal 32, receiver 23, data request decoder 28 and switch 25 shown in FIG. 2 are removed, so that an output of a receiver 24 is directly applied to a non-volatile memory 27. Furthermore, in the present embodiment, if a data request signal is input to a terminal 33 so as to overlap a vertical synchronization signal, the data request signal is supplied through receiver 24 to non-volatile memory 27, information is read from non-volatile memory 27, and the read information is output from a driver 21 through a data terminal 31 to a computer 1.

Figure 4:
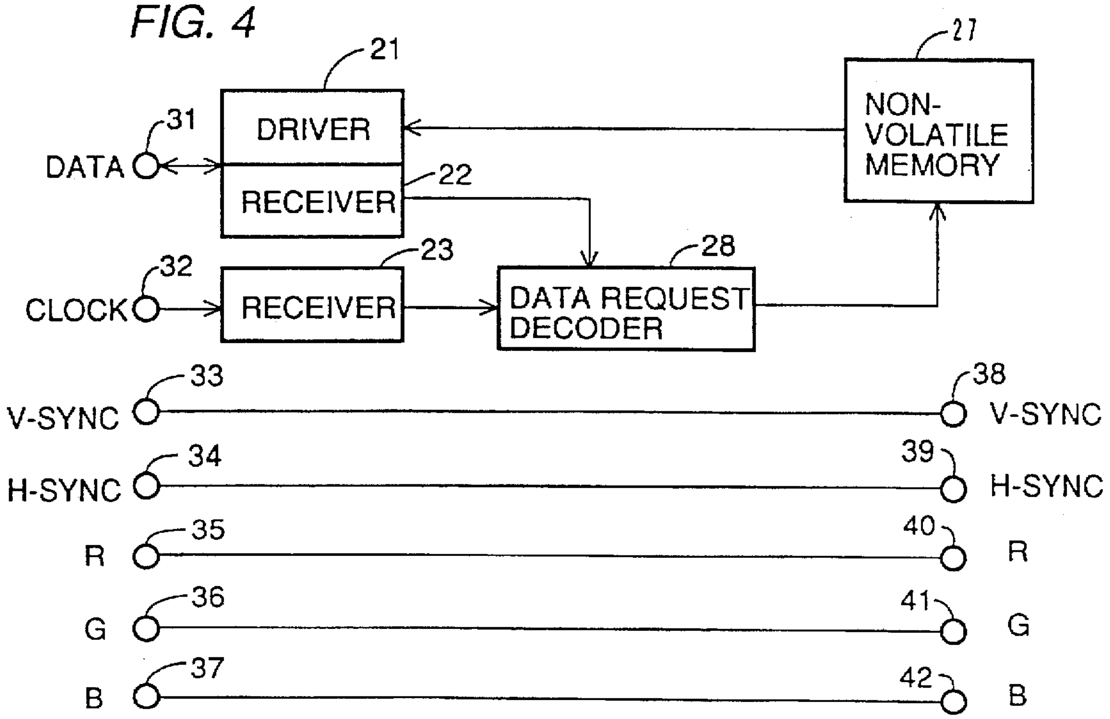
FIG. 4 is a block diagram showing a monitor adapter in accordance with a further embodiment of the present invention.
Figure 5:
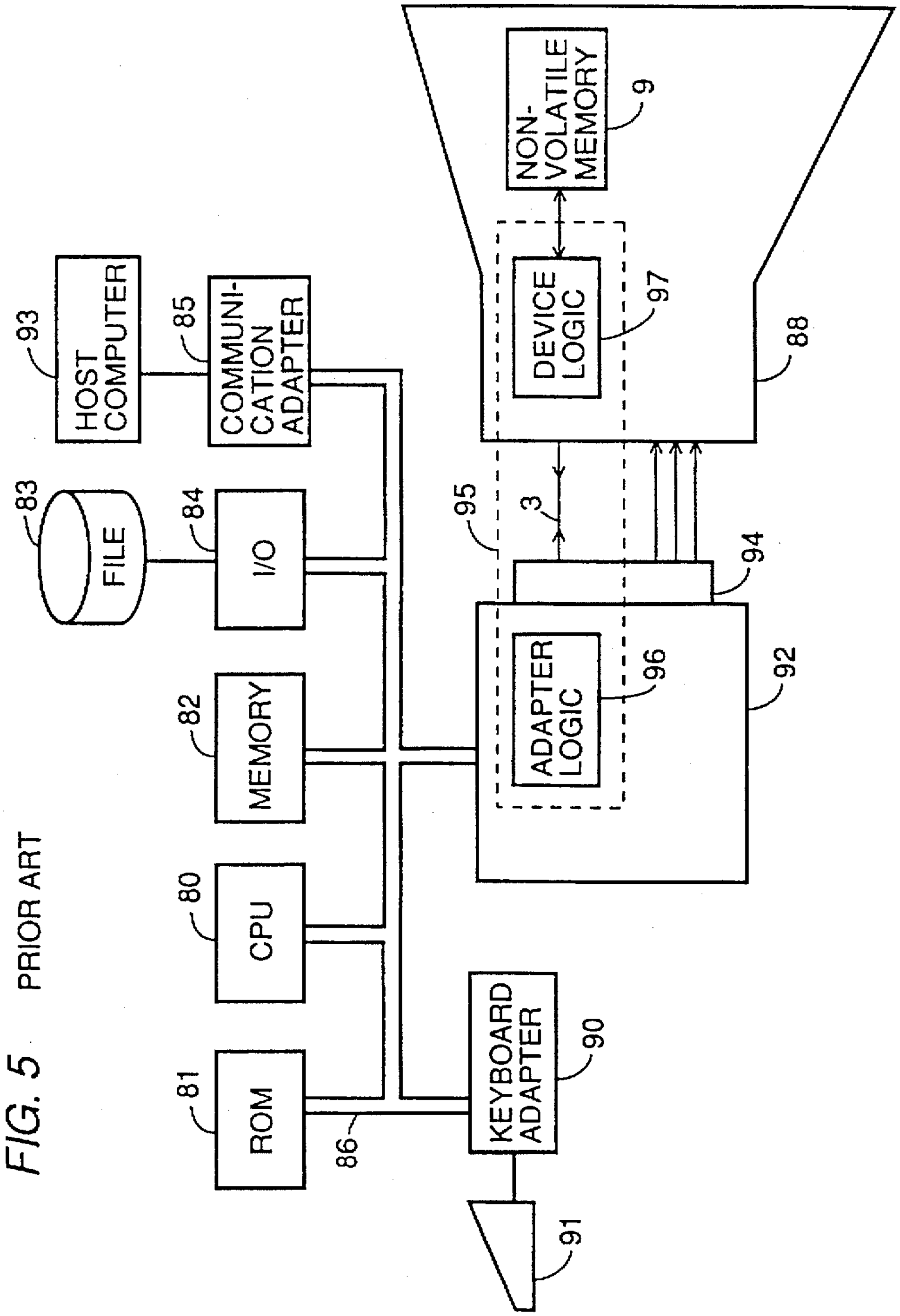
FIG. 5 PRIOR ART
FIG. 5 is a block diagram showing a conventional display signal.

FIG. 4 is a block diagram showing a further embodiment of the present invention. The embodiment shown in FIG. 4 is intended to deal only with DDC2B, and receiver 24, switch 25 and high cut filter 26 shown in FIG. 2 are removed, so that an output of a data request decoder 28 is directly applied to a non-volatile memory 27. Furthermore, in the present embodiment, if a data request signal is applied to a data terminal 31 and a clock terminal 32, the data request signal is applied through a receiver 22 to data request decoder 28, and data request decoder 28 decodes the data request signal based on a clock signal applied thereto through a receiver 23, and applies the decoded signal to non-volatile memory 27. Non-volatile memory 27 reads information, and outputs information related to a video monitor 4 from a driver 21 through data terminal 31 to a computer 1.

Although a data request signal is made to overlap a vertical synchronization signal in the embodiments shown in FIGS. 2 and 3, a data request signal may be made to overlap a horizontal synchronization signal. In such a case, a high cut filter 26 is not necessary.

APPLICABLE FIELD IN THE INDUSTRY

A monitor adapter in accordance with the present invention can carry out Plug and Play according to a class of DDC1 or DDC2B by merely connecting the monitor adapter between a computer and a video monitor, and can apply an optimal color image signal from the computer to the video monitor even if the video monitor is a conventional video monitor.

What is claimed is:

1. A monitor adapter connected between a computer and a video monitor for causing an optimal video signal to be output from said computer according to a condition of said video monitor, comprising:

a data terminal for transmitting and receiving data to and from said computer bidirectionally;

a first terminal for receiving a data request signal sent so as to overlap a synchronization signal from said computer in a first mode;

a second terminal receiving, together with said data terminal, a data request signal sent from said computer in a second mode;

storage means for prescribing information on said video monitor; and switching control means responsive to the data request signal sent to said first terminal for reading information from said storage means and outputting the read information to said data terminal in said first mode, and responsive to the data request signal sent to said data terminal and said second terminal for reading information from said storage means and outputting the read information to said data terminal in said second mode.

2. The monitor adapter according to claim 1, wherein said switching control means includes switching means having its input switched to a side of said first terminal in said first mode and switched to a side of said second terminal in response to supply of a part of a data request signal to said data terminal.

3. The monitor adapter according to claim 2, further comprising:

a first receiver for receiving a part of a data request signal applied to said data terminal and switching the input of said switching means to a side of said second terminal at its output.

4. The monitor adapter according to claim 3, further comprising:

a driver for outputting information read from said storage means to said data terminal.

5. The monitor adapter according to claim 3, further comprising:

a second receiver for receiving a vertical synchronization signal and a data request signal input to said first terminal and applying the received signals to said switching means.

6. The monitor adapter according to claim 3, further comprising:

a third receiver for receiving a part of a data request signal input to said second terminal and applying the received signal to said switching means.

7. The monitor adapter according to claim 5, further comprising:

a filter for removing a data request signal contained in an output of said second receiver and outputting only a vertical synchronization signal to said video monitor.

8. The monitor adapter according to claim 2, further comprising:

a plurality of I/O terminals for respectively receiving a horizontal synchronization signal and RGB color signals output from said computer and outputting the received signals to said video monitor.

* * * * *